(12) United States Patent
Volodarsky et al.

(10) Patent No.: US 8,001,297 B2
(45) Date of Patent: Aug. 16, 2011

(54) DYNAMIC ADJUSTING SEND RATE OF BUFFERED DATA

(75) Inventors: Michael D. Volodarsky, Seattle, WA (US); Patrick Yu-Kwan Ng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/114,310

(22) Filed: Apr. 25, 2005

(65) Prior Publication Data

US 2007/0011327 A1   Jan. 11, 2007

(51) Int. Cl.
*G06F 5/00* (2006.01)

(52) U.S. Cl. ............... 710/57; 710/52; 710/26; 709/226

(58) Field of Classification Search ................... 709/235, 709/226; 710/26, 52, 57
See application file for complete search history.

(56) References Cited

U.S. PATENT DOCUMENTS

| | | | |
|---|---|---|---|
| 4,378,588 A * | 3/1983 | Katzman et al. ................. 710/57 |
| 5,675,742 A * | 10/1997 | Jain et al. ....................... 709/226 |
| 5,950,015 A * | 9/1999 | Korst et al. ................... 455/3.02 |
| 6,125,396 A * | 9/2000 | Lowe ............................. 709/234 |
| 6,125,397 A * | 9/2000 | Yoshimura et al. ........... 709/235 |
| 6,192,406 B1 * | 2/2001 | Ma et al. ........................ 709/226 |
| 6,247,072 B1 * | 6/2001 | Firestone ......................... 710/53 |
| 6,249,755 B1 * | 6/2001 | Yemini et al. ................. 702/183 |
| 6,279,050 B1 * | 8/2001 | Chilton et al. ................... 710/20 |
| 6,694,389 B2 * | 2/2004 | Coates et al. .................... 710/52 |
| 6,772,243 B2 * | 8/2004 | Jones et al. ...................... 710/57 |
| 6,775,723 B2 * | 8/2004 | Gregg et al. ..................... 710/57 |
| 2004/0078685 A1 * | 4/2004 | Glass ............................... 714/38 |
| 2005/0264401 A1 * | 12/2005 | Haller et al. ................. 340/10.1 |
| 2006/0150248 A1 * | 7/2006 | Ross et al. ....................... 726/22 |

* cited by examiner

*Primary Examiner* — Saleh Najjar
*Assistant Examiner* — Eric W Shepperd
(74) *Attorney, Agent, or Firm* — Merchant & Gould

(57) ABSTRACT

Systems and methods for intermediate buffering of data for the purpose of controlling its delivery to the consumer. The systems and methods for buffering data can arbitrate between the incoming data flow from the generating component and the outgoing data flow to the consumer. In doing so, the systems and methods for buffering of data seek to honor the delivery demands and/or constraints of the consumer, while avoiding the loss of the data generated by the producer. The delivery demands of the consumer may include requirements pertaining to maximum acceptable incoming data rate, the desired incoming data rate, incoming data aggregation, the desired freshness of the data, and tolerance for event loss. The generation component constraints may include the space limitations on buffering data within the data buffer.

19 Claims, 6 Drawing Sheets

US 8,001,297 B2

DYNAMIC ADJUSTING SEND RATE OF BUFFERED DATA

TECHNICAL FIELD

The present invention relates to computer-implemented methods and systems, and more particularly to computer-implemented methods and systems for buffering events from an instrumentation system.

BACKGROUND

Some software systems include an instrumentation system to, among other things, assist in debugging, audit user actions and monitor performance and/or overall health of the system. For example, some server applications include an instrumentation system for such monitoring. Typically, these systems define two distinct roles that system components participate in when dealing with instrumentation: the generation of instrumentation data, referred to as events in the rest of this document, and the consumption and analysis of the instrumentation events, which may also include the relaying of the instrumentation events from the producer to the consumer. For example, a server application may generate instrumentation events describing the service requests it processes, and may relay this data via the network to a database where a human administrator queries it to review application usage. In such a system, the generation of the instrumentation events, and the transfer and analysis of it may happen under vastly different and variable rates, often due to the processing and space constraints of the relaying and consumption mechanism, and the frequently uncontrollable rate of generation which depends on application usage. Because of this, there is a need for a mechanism that seeks to honor the processing constraints and the desired event delivery demands of the consumer and the transfer channel, while avoiding the loss of real-time generated instrumentation events.

SUMMARY

According to aspects of various embodiments, systems and methods for buffering and delivering data generated by a data producer and delivered to a data consumer are provided. Some aspects are directed to instrumentation data, known as events, but methods and systems can be generically applied to other data flow usages. In one aspect, the systems and methods for buffering instrumentation data send stored events to a consumer at a dynamically determined delivery rate that depends at least in part on the consumer's desired regular delivery rate and a maximum acceptable delivery rate. In addition, the dynamically determined delivery rate can depend on one or more of: the buffer threshold level, the maximum buffer size, and the maximum event aggregation size. This aspect can help the instrumentation honor the consumer's event delivery constraints.

In another aspect, when the number of events stored by the buffer exceeds the delivery threshold, the flush rate can increase from a regular delivery rate to an urgent delivery rate, but not exceed the maximum delivery rate. This aspect can help improve the responsiveness of the instrumentation system.

In yet another aspect, the systems and methods for buffering instrumentation data can include mechanisms to delete events from the buffer when it is full. For example, when the buffer is full and more events are to be stored, events are deleted from the buffer in a manner such that the consumer receives a subset of events that is evenly distributed throughout time. This aspect can help prevent uneven event loss, resulting in total lack of information about a particular period of the instrumented system's operation.

Embodiments may be implemented as a computer process, a computing system (not limited to mobile computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF ILLUSTRATED EMBODIMENTS

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

According to various embodiments, systems and methods for intermediate buffering of instrumentation data for the purpose of controlling its delivery to the consumer are described. The main purpose of some of the embodiments is to arbitrate between the incoming instrumentation event flow from the generating component and the outgoing instrumentation event flow to the consumer. In doing so, these embodiments seek to honor the delivery demands and/or constraints of the consumer, while avoiding the loss of the instrumentation events generated by the producer. The delivery demands of the consumer may include requirements pertaining to maximum acceptable incoming data rate, the desired incoming event rate, incoming event aggregation, the desired freshness of the instrumentation events, and tolerance for event loss. The generation component constraints may include the space limitations on buffering events within the instrumentation event buffer. Various embodiments are described below.

Figure 1:
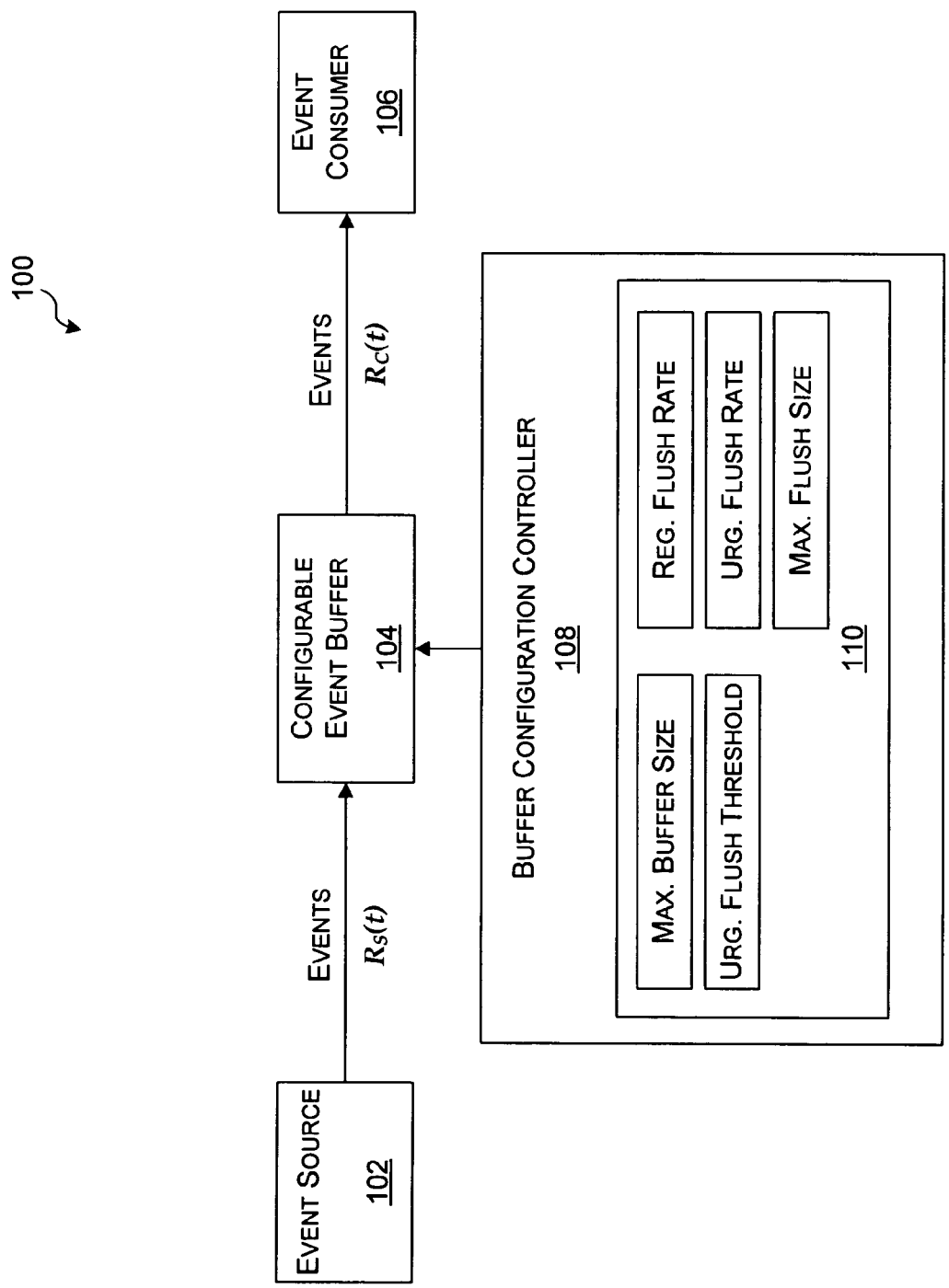
FIG. 1 is a block diagram illustrating an event buffering system, according to an exemplary embodiment.

FIG. 1 illustrates an event buffering system 100, according to an exemplary embodiment of the present invention. In this embodiment, event buffering system 100 includes an event source 102, a configurable event buffer 104, an event consumer 106 and a buffer configuration controller 108. In one embodiment, buffer configuration controller 108 includes a data store 110 with several fields. For example, in this embodiment, data store 110 includes fields for:

- a maximum buffer size of configurable event buffer 104;
- a regular flush rate at which events are sent from configurable event buffer 104 to event consumer 106 (the regular flush rate may be expressed as a regular flush interval; i.e., a minimum time between messages containing one or more events);
- an urgent flush rate (i.e., a fast rate) at which events are sent from configurable event buffer 104 to event consumer 106);
- an urgent flush threshold (i.e., the number of events stored in configurable event buffer 104 above which the urgent flush rate is used to flush configurable event buffer 104);
- a maximum flush size (i.e., the maximum number of events that can be aggregated into a message and sent to event consumer 106).

In other embodiments, additional or fewer fields can be used in data store 110 in configuring the configurable event buffer 104. For example, data store 110 may include a field for a regular flush threshold (not shown), to introduce hysteresis in the transitions between the regular and urgent flush rates. In one embodiment, the regular flush threshold represents a number of stored events below which configurable event buffer 104 uses the regular flush rate. In addition, the data store may include fields (not shown) for flags to indicate various states of configurable event buffer 104 such as, for example, whether configurable event buffer 104 is to use the urgent flush rate, whether configurable event buffer 104 is to use the regular flush rate. Still further, the data store may include fields (not shown) for holding timing data such as the time elapsed since a message was last flushed from configurable event buffer 104 to event consumer 106.

In operation, event source 102 generates events based on monitoring one or more processes. For example, event source 102 may be an instrumentation system of a server system monitoring the operations of an application. An event as used herein refers to a data container with instrumentation data, which includes an occurrence time associated with the instrumentation data. The rate $R_S(t)$ at which event source 102 generates events can vary with time due to differences in application usage. One exemplary flow of generated events is illustrated in FIG. 2, described below.

Figure 2:
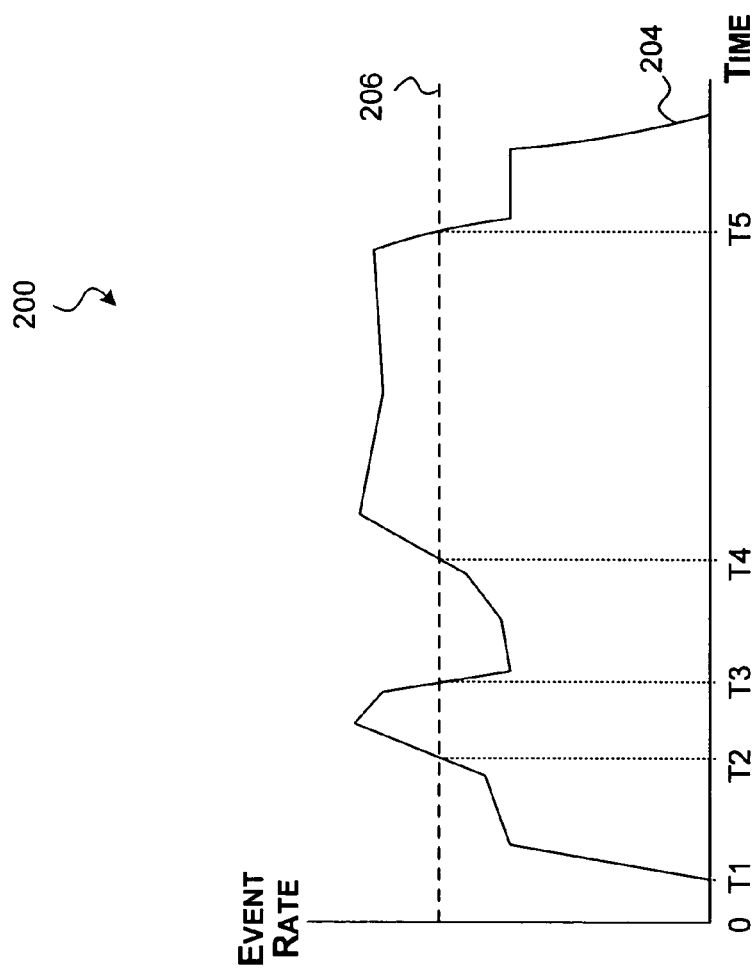
FIG. 2 is an exemplary diagram illustrating events generated by an instrumentation system to be processed by the event buffering system of FIG. 1.

Graph 200 of FIG. 2 shows an example curve 204 representing the number of events per unit time generated by event source 102 (FIG. 1) as a function of time. A line 206 is also shown to indicate the maximum consumption rate of event consumer 106 (FIG. 1). For example, as shown in FIG. 2, there may be time periods (e.g., between time zero and time T1) in which event source 102 generates no events (i.e., silence). There may be instances in which event source 102 generates a single event in a relatively long period of time (not shown in FIG. 2). This type of event is referred to herein as a single flow. There may be time periods in which event source 102 generates some events, but the number per unit time is below the maximum consumption rate of event consumer 106 (e.g., between times T1 and T2, and between times T3 and T4). This type of event flow is referred to herein as a stream. There may also be relatively short time periods in which event source 102 generates events at a rate greater than the maximum consumption rate of event consumer 106 (e.g., between times T2 and T3). This type of event flow is referred to herein as a burst. There may also be relatively long time periods in which event source 102 generates events at a rate greater than the consumption rate of event consumer 106 (e.g., between times T4 and T5). This type of event flow is referred to herein as a flood. The difference between bursts and floods is that bursts will not overflow configurable event buffer 104 (FIG. 1) whereas a flood will overflow configurable event buffer 104, thereby dropping or losing some events.

Referring again to FIG. 1, the events from event source 102 are received by configurable event buffer 104 and temporarily stored until they are all, ideally, sent to event consumer 106. Configurable event buffer 104 is configured to send stored events to event consumer 106. The rate $R_C(t)$ at which configurable event buffer 104 sends the stored events can vary with time. In this embodiment, configurable event buffer 104 has several configurable parameters that correspond to one or more of the aforementioned fields of the data store of buffer configuration controller 108. The rate $R_C(t)$ depends on the number of events stored in configurable event buffer 104 and the values of fields of data store 110 such as, for example, the maximum buffer size, the regular flush rate, the urgent flush rate, urgent flush threshold, and maximum flush size.

Many of the settings of the fields in data store 110 can be determined by event consumer 106, or the user of event consumer 106. For example, in one scenario the user of event consumer 106 is a human operator that would like to examine each event as they are sent by configurable event buffer 104. In this scenario, the user can set the regular flush rate at a relatively slow rate (e.g., a message no faster than every five minutes) with only moderate responsiveness, and the flush size may be a moderately small number such as twenty to thirty events. These settings for regular flush rate and flush size allow the human operator to comfortably view data contained in each event within a reasonable response time. Continuing this example, the urgent flush rate may be set at a faster rate the human operator can still handle but may not be comfortable for the operator to view (e.g., an event no faster than every three minutes), together with an urgent flush threshold set at 50 events to make sure that the operator is notified more quickly than the regular flush interval when a large amount of events is generated by the application. The other fields may be set depending on the importance of receiving each event without loss. Where keeping losses to a minimum is very important, the maximum buffer size can be made large (e.g., a large memory allocation) and the urgent flush threshold can be set relatively low (e.g., at fifty percent of the maximum buffer size).

There are, of course, an almost unlimited number of scenarios and, in accordance with various embodiments, event buffering system 100 may be configured or reconfigured to optimally perform for these various scenarios. In one embodiment, scenarios are modeled according to the following considerations: responsiveness, aggregation, notification size, and drop behavior. Responsiveness characterizes how soon event consumer 106 receives an event after the event is generated by event source 102. Aggregation characterizes how event source 102 combines events into messages or notifications. A notification is a collection of events that is delivered at a time, such as part of a mail message. The delivery rates are expressed in terms of notifications per period of time. Notification size characterizes how many events can be sent in a notification or message, or how big (e.g., number of bits or bytes) the notification can be in systems in which events can vary in size. Drop behavior characterizes under what conditions events are dropped (i.e., not sent to event consumer 106).

In one scenario type, the user wants to be notified as quickly as possible of critical events so that user can take immediate corrective action. This type of scenario is referred to herein as a critical notification type scenario. In critical notification scenarios, configurable event buffer 104 is configured to deliver events as soon as they are received but no faster than the urgent flush rate. The flush size may be limited to a small number (e.g., twenty events). In systems configured for critical notification type scenarios, configurable event buffer 104 is more easily overflowed and, thus, the drop behavior is configured so that some buffered events are dropped in favor of new events. In some embodiments, event buffering system 100 may store a default configuration in data store 110 for critical notification scenarios.

In a second scenario type, the user can tolerate a decrease in responsiveness in order to drop fewer events. This type of scenario is referred to herein as a notification type scenario. Configurable event buffer 104 can be configured for notification scenarios by increasing the delay time compared to critical notification scenarios (e.g., fifteen minutes maximum delay instead of five minutes maximum delay as in critical notification scenarios). In some embodiments, event buffering system 100 may store a default configuration in data store 110 for notification scenarios.

In a third scenario type, the user wishes to receive up-to-date instrumentation data on a regular schedule. This type of scenario is referred to herein as an analysis type scenario. For example, in an analysis type scenario, configurable event buffer 104 may be configured to send messages of up to the maximum flush size at a regular time interval (e.g., every five minutes). The maximum flush size may be larger than in notification type scenarios. For example, the maximum flush size for an analysis type scenario may be one hundred events, and the maximum notification delay can be nominal (e.g., ten minutes). The urgent flush rate may be relatively fast (e.g., no faster than one minute between messages). The analysis type of scenario provides a near "real-time" delivery of events with the ability to handle larger bursts of events without having to drop events. In some embodiments, event buffering system 100 may store a default configuration in data store 110 for analysis scenarios.

In a fourth scenario, the user of event consumer 106 need not analyze the events for a relatively long time after the events are generated (e.g., for future analysis or documentation purposes) and would like to minimize loss of events. This type of scenario is referred to herein as a logging type scenario. In one example embodiment, event consumer 106 may be a relatively large storage device, the flush size is two hundred events, and the regular flush rate is thirty minutes. In case of bursts or floods, the urgent flush rate is five minutes. In some logging type scenarios, the maximum notification delay is set to a maximal value or not used. In some embodiments, event buffering system 100 may store a default configuration in data store 110 for logging scenarios.

Although various scenarios are described above to illustrate the operation of event buffering system 100, these scenarios are not intended to be limiting. Rather, these scenarios are intended to illustrate the flexibility of event buffering system 100 to buffer events to accommodate the needs of various users.

Figure 3:
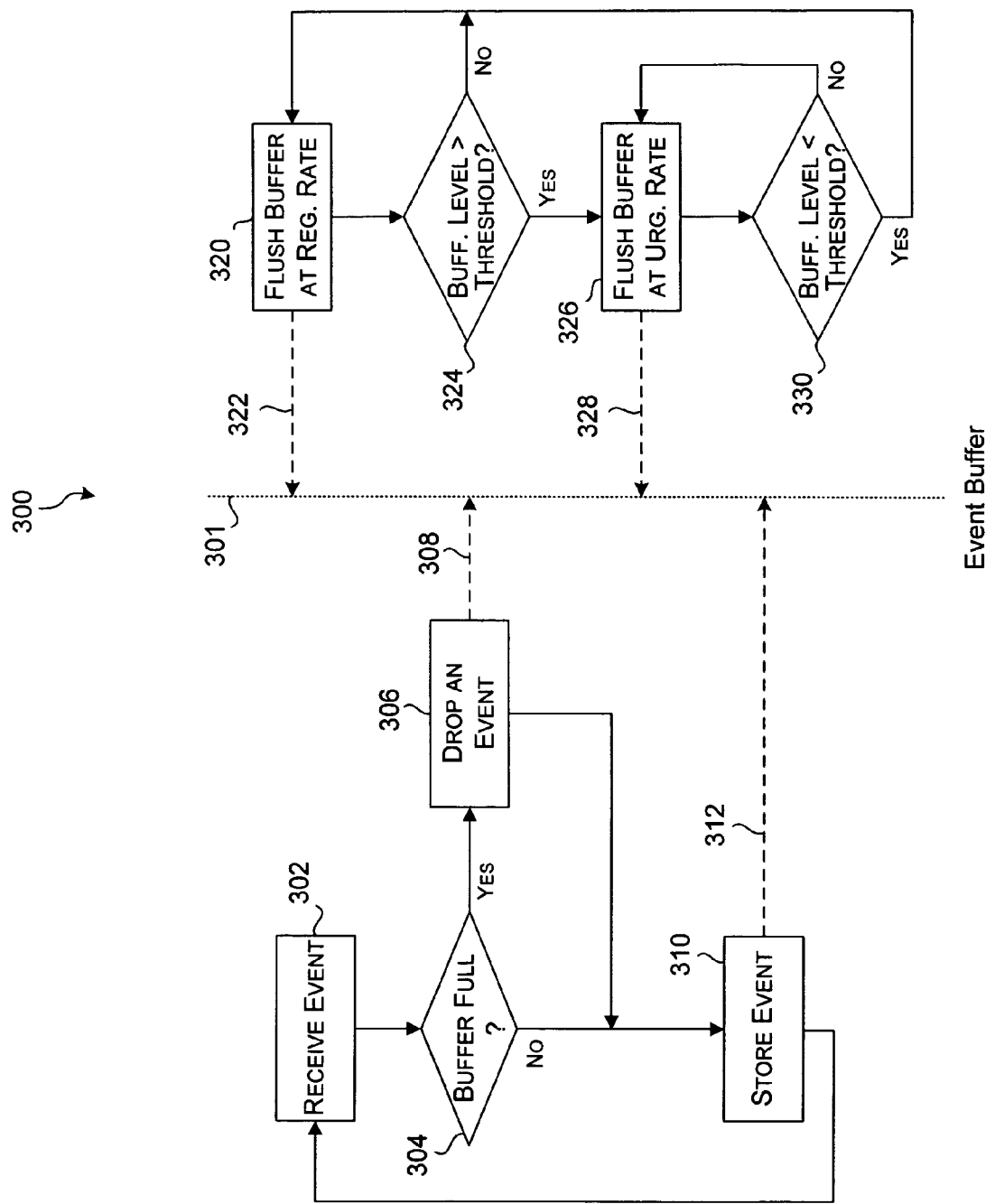
FIG. 3 is a flow diagram illustrating operational flow in buffering events generated by an instrumentation system, according to an exemplary embodiment.

FIG. 3 is a flow diagram illustrating an operational flow 300 in buffering events generated by an instrumentation system, according to an exemplary embodiment of the present invention. Operational flow 300 may be performed in any suitable computing environment. For example, operational flow 300 may be executed by system 100 of FIG. 1 and, therefore, the description of operational flow 300 may refer to at least one of the components of FIG. 1. However, any such reference to a component of FIG. 1 is for descriptive purposes only, and it is to be understood that the implementation of FIG. 1 is a non-limiting environment for operational flow 300.

As can be seen in FIG. 3, operation flow 300 includes two component operational flows: (1) an operational flow to add and drop events to and from an event buffer (indicated by a vertical dashed line 301 in FIG. 3), which is referred to herein as a buffer input process; and (2) an operational flow to flush the configurable event buffer, which is referred to herein as a buffer flush process. These component operational flows "run" concurrently and in this embodiment are somewhat independent in that they will both continue to run without regard to the other; however, the component operational flows do influence each other because they both depend on and directly affect the number of events stored in the configurable event buffer.

Buffer Input Process

At a block 302, an event is received from an event source such as, for example, event source 102 (FIG. 1). In one embodiment, the event is received by an event buffer, but not yet stored in a first-in-first-out (FIFO)-type data structure used by the event buffer to store events. The event buffer may be implemented in any suitable form such as, for example, the event buffer formed by configurable event buffer 104 (FIG. 1) and buffer configuration controller 108 (FIG. 1).

At a block 304, the event buffer is checked to determine if it is full. In one embodiment, a controller such as the aforementioned buffer configuration controller 108 determines whether the event buffer is full. As previously described, the event buffer may become full during an event flood. If the event buffer is full, operational flow proceeds to a block 306.

At block 306, an event already stored in the event buffer is dropped or deleted. In one embodiment, a controller such as buffer configuration controller 108 causes the event buffer to drop a stored event, as indicated by the dashed arrow 308. In some embodiments, the oldest event stored in the event buffer is dropped. In this way, "gaps" in the flood of events will be distributed, rather than just dropping events that are concentrated about the time the buffer was filled. In some embodiments, the dropped event may be chosen so that consecutive events are not dropped. In some scenarios, this technique of distributing gaps in the flood of events may help the user in analyzing the cause of the flood.

However, if at block 304 it is determined that the event buffer is not full, operational flow proceeds to a block 310. At block 310, the event is stored in the event buffer. In one embodiment, a controller such as buffer configuration controller 108 causes the event received at block 302 to be stored in the event buffer, as indicated by a dashed arrow 312.

Buffer Flush Process

At a block 320, the event buffer is flushed at a regular flush rate. The buffer flush process will typically start at the regular flush rate because the event buffer usually starts empty when the process first begins. In one embodiment, a controller such as buffer configuration controller 108 (FIG. 1) causes the event buffer to flush at the regular flush rate, as indicated by a dashed arrow 322. In one embodiment, the regular flush rate is defined by a value stored in the regular flush rate field of data store 110 (FIG. 1) of buffer configuration controller 108.

At a block 324, the number of events stored in the event buffer (i.e., the buffer level) is checked to determine if the number exceeds a threshold. In one embodiment, a controller such as buffer controller 108 compares the buffer level with the threshold. In one embodiment, the threshold is a setting that can be accessed by the controller. For example, the threshold may be the value stored in the urgent flush threshold field of data store 110. If the buffer level does not exceed the threshold, operational flow returns to block 320. However, if at block 324, the buffer level does exceed the threshold, operational flow proceeds to a block 326.

At block 326, the flush rate is changed to an urgent flush rate, which is typically significantly greater than the regular flush rate. In one embodiment, a controller such as buffer configuration controller 108 causes the flush rate to increase to the urgent flush rate, as indicated by a dashed arrow 328. In one embodiment, the urgent flush rate is a stored value or setting such as the value stored in the urgent flush rate field of data store 110.

At a block 330, the buffer level is checked to determine if the number is below a threshold (which may or may not be the same threshold of block 324). In one embodiment, a controller such as buffer configuration controller 108 compares the buffer level with the threshold. In one embodiment, the threshold has a value that is lower than the threshold of block 324 to introduce hysteresis in the transitions between the regular and urgent flush rates. If the buffer level is not below the threshold of block 330, operational flow returns to block 326. However, if at block 330 it is determined that the buffer level is below the threshold, operational flow returns to block 320 to set the flush rate to the regular flush rate.

Although process 300 is illustrated and described as having a buffer input process and a buffer flush process, with each process being sequential, in other embodiments, the operations described in the blocks may be performed in different orders, multiple times, and/or in parallel.

Figure 4:
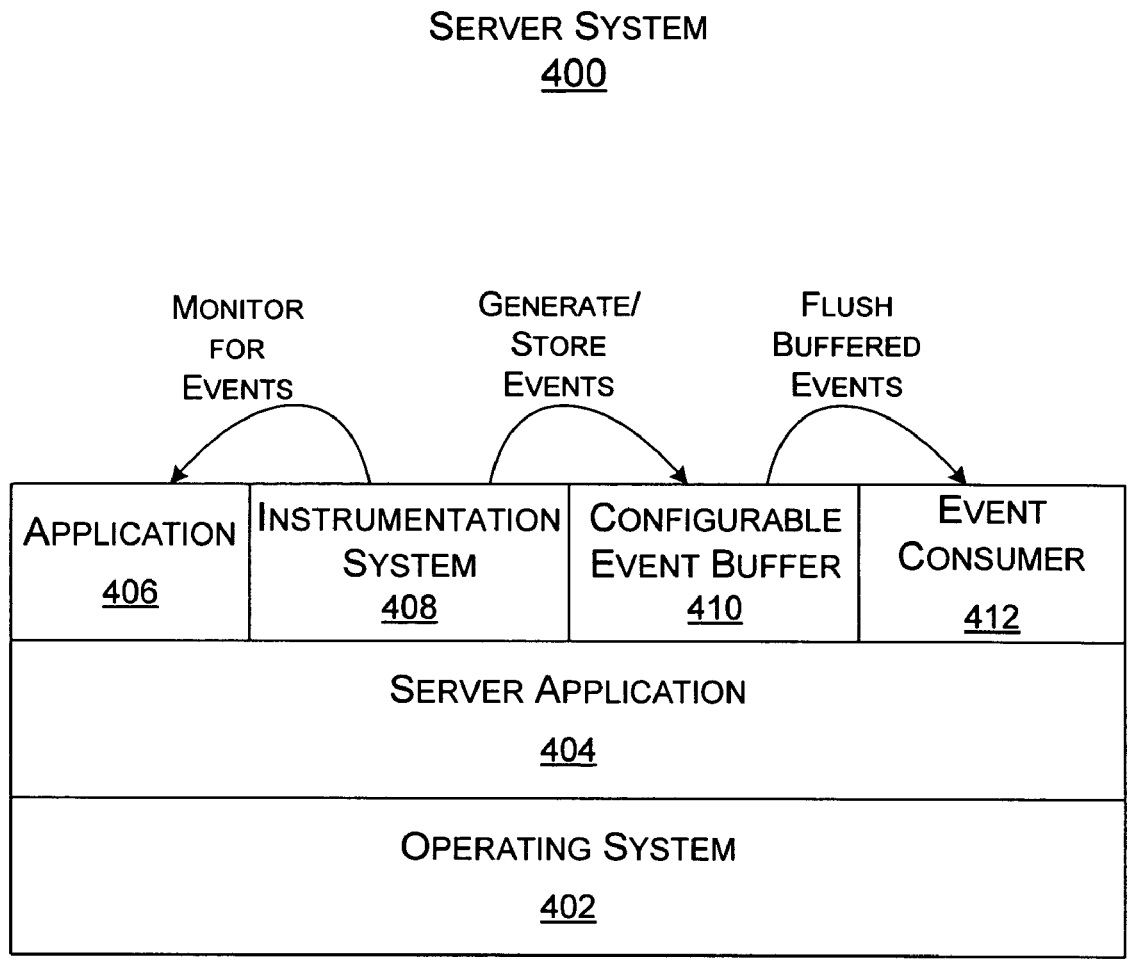
FIG. 4 is a block diagram illustrating an exemplary system using an event buffering system according to an exemplary embodiment.

FIG. 4 illustrates an exemplary system 400 using an event buffering system according to an exemplary embodiment of the present invention. In this embodiment, system 400 is a server system that includes an operating system 402, and a server application 404. Further, in this embodiment, system 400 includes an application 406, instrumentation system 408, configurable event buffer 410 and an event consumer 412 running on top of the server application. In one embodiment, server application 404 is Internet Information Server (IIS) available from Microsoft Corporation, Redmond, Wash. Instrumentation system 408 can be any suitable instrumentation system. In one embodiment, configurable event buffer 410 and event consumer 412 are substantially similar to configurable event buffer 104 and event consumer 106 described above in conjunction with FIG. 1.

In operation, application 406 executes and can perform operations, enter states, etc. that are defined as events by instrumentation system 408. Instrumentation system 408 is configured to monitor the operation of application 406 and generate events upon detection of such operations or state changes. Configurable event buffer 410 then stores events generated by instrumentation system 408. For example, instrumentation system 408 can function as described above for event source 102 (FIG. 1). Configurable event buffer 410 would then temporarily store events from instrumentation system 408 and flush stored events to event consumer 412 as described above for configurable event buffer 104 (FIG. 1). In one embodiment, configurable event buffer 410 can be controlled by a controller such as buffer configuration controller 108 (FIG. 1). Thus, in accordance with such an embodiment, users can configure the event buffering to meet their preferences with regard to $R_C(t)$, responsiveness, aggregation, notification size, and drop behavior.

In other embodiments, system 400 could include multiple applications 406, multiple event consumers 412, as can be the case in a busy server system. Each of the multiple event consumers 412 would have an associated configurable event buffer 410. Although a server system is described, this server system is not intended to be limiting. Rather, the server system example is intended to illustrate one possible use of an embodiment of event buffering system with a configurable event buffer.

Figure 5:
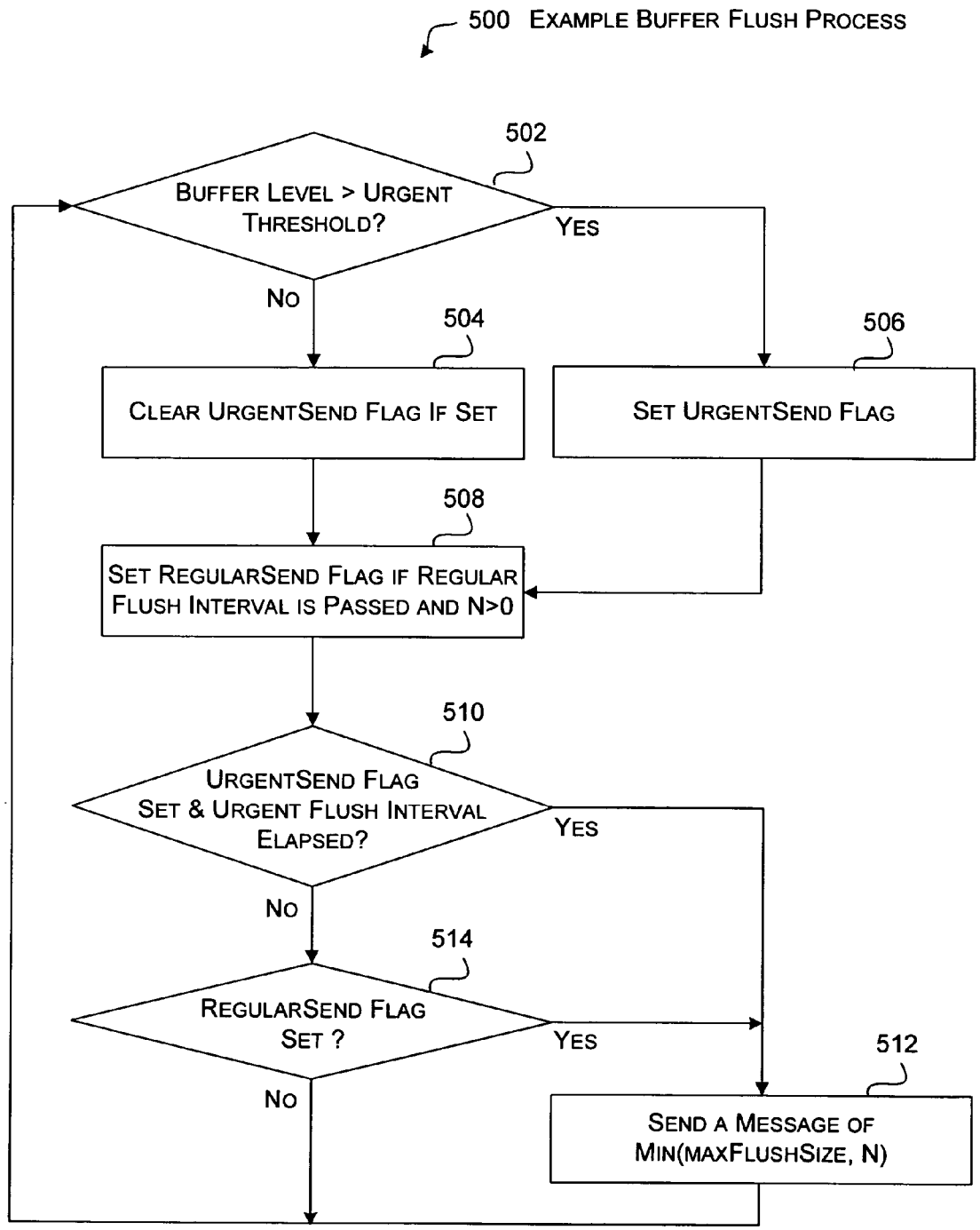
FIG. 5 is a flow diagram illustrating operational flow of an event buffering system, according to an exemplary embodiment.

FIG. 5 illustrates an operational flow 500 of a buffer flushing process in more detail, according to an exemplary embodiment of the present invention. Operational flow 500 may be performed in any suitable computing environment. For example, operational flow 500 may be executed by event buffering system 100 of FIG. 1 and, therefore, the description of operational flow 500 may refer to at least one of the components of FIG. 1. However, any such reference to a component of FIG. 1 is for descriptive purposes only, and it is to be understood that the implementation of FIG. 1 is a non-limiting environment for operational flow 500.

At a block 502, the buffer level of an event buffer is checked to determine whether the buffer level exceeds an urgent flush threshold. This block is similar to block 324 described above in conjunction with FIG. 3. The event buffer may be implemented in any suitable form such as, for example, the event buffer formed by configurable event buffer 104 (FIG. 1) and buffer configuration controller 108 (FIG. 1). If the buffer level does not exceed the urgent flush threshold, the operational flow proceeds to a block 504.

At block 504, an UrgentSend flag is cleared. The UrgentSend flag when set causes the event buffer to flush events at the urgent flush rate. However, if at block 502 the buffer level does exceed the urgent flush threshold, operational flow proceeds to a block 506. At block 506, the UrgentSend flag is set. Operational flow from blocks 504 and 506 both then proceed to a block 508 in this embodiment.

At block 508, a RegularSend flag is set if the regular flush interval has elapsed and the number of events (referred to herein by the letter N) is greater than zero (i.e., the event buffer is not empty). The RegularSend flag when set causes the event buffer to send out a message (that contains one or more events). When the message is sent, the event buffer clears the RegularSend flag and resets an elapsed time timer (not shown) that measures the time interval between messages. If the above conditions are not satisfied, the RegularSend flag remains cleared. Operational flow then proceeds to a block 510.

At block 510, the UrgentSend flag and an UrgentFlushInterval value are checked to determine whether the UrgentSend flag is set and whether the elapsed time timer has exceeded the UrgentFlushInterval. The UrgentFlushInterval is a time value that is derived from the urgent sent rate, representing the time between sent messages that are sent by the event buffer at the urgent send rate. If these two conditions are met (i.e., the urgent send rate must be used), operational flow proceeds to a block 512.

At block 512, the event buffer sends a message to an event consumer. In this embodiment, the message has a number of events that is the minimum of either a maximum flush size, or N (i.e., the number of events currently stored in the event buffer). As previously described, after the message is sent, the elapsed time timer is reset and the RegularSend flag is cleared. The operational flow then returns to block 502.

However, if at block 510 the conditions are not met (i.e., the regular send rate must be used), operational flow proceeds to a block 514. At block 514, the RegularSend flag is checked to determine if it has been set (e.g., at block 508). If the RegularSend flag has been set, operational flow proceeds to block 512 (described above) to send a message to the event consumer. If the RegularSend flag has been set, operational flow returns to block 502.

Although process 500 is illustrated and described sequentially in a particular order, in other embodiments, the operations described in the blocks may be performed in different orders, multiple times, and/or in parallel.

Illustrative Operating Environment

Figure 6:
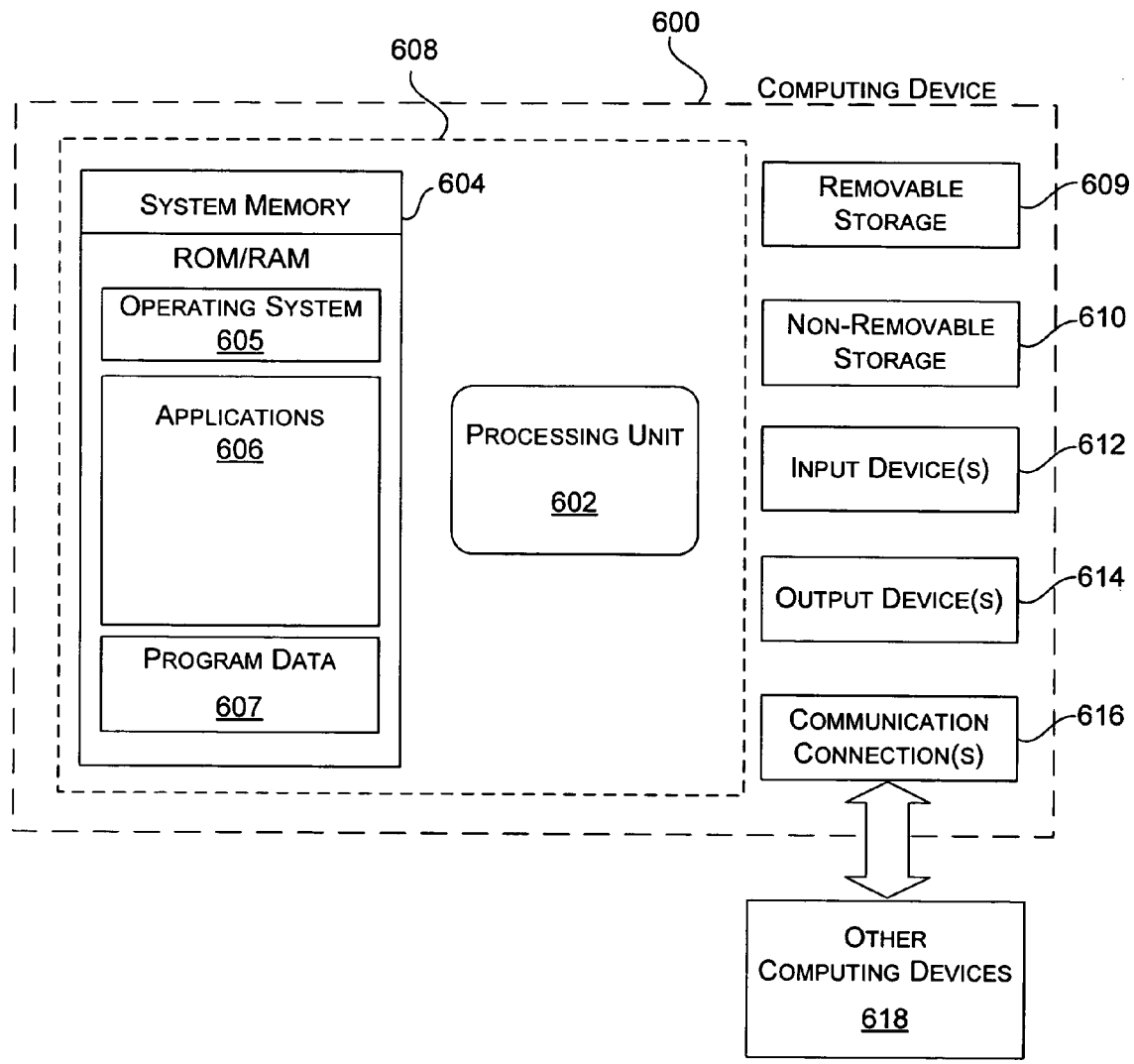
FIG. 6 is a block diagram illustrating a computing environment that may be used according to exemplary embodiments.

With reference to FIG. 6, one exemplary system for implementing the invention includes a computing device, such as computing device 600. Computing device 600 may be configured as a client, a server, mobile device, or any other computing device. In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 605, one or more applications 606, and may include program data 607. This basic configuration is illustrated in FIG. 6 by those components within dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as a keyboard, mouse, pen, voice input device, touch input device, etc. Output device(s) 614 such as a display, speakers, printer, etc. may also be included.

Computing device 600 also contains communication connections 616 that allow the device to communicate with other computing devices 618, such as over a network. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although the invention has been described in language specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for buffering data, the computer-implemented method comprising:
   receiving events from an instrumentation system in response to monitoring of a process, a portion of the events being generated by the instrumentation system at times during the monitoring of the process at a rate below a maximum data consumption rate of a consumer and another portion of the events being generated by the instrumentation system at a rate above the maximum data consumption rate of the consumer;
   storing each of the events in a configurable buffer, wherein the buffer includes data fields set for controlling operation of the buffer, the data fields comprising: a maximum buffer size, a regular flush rate; an urgent flush rate, an urgent flush threshold and a maximum flush size;
   determining a dynamic delivery rate using: a desired data consumption rate of the consumer, the maximum data consumption rate of the consumer and a first flag relating to a number of events currently stored in the buffer;
   obtaining a set of events from the buffer;
   sending a single message comprising the set of events obtained from the buffer to a consumer at the dynamically determined delivery rate, wherein an amount of the events within the set of events to send within the single message is configurable.

2. The computer-implemented method of claim 1 wherein the maximum data consumption rate of the consumer is defined by the consumer.

3. The computer-implemented method of claim 1 wherein the maximum data consumption rate of the consumer is defined as a frequency and size of messages sent to the consumer.

4. The computer-implemented method of claim 1 wherein the dynamically determined delivery rate ranges between the desired data consumption rate of the consumer and the maximum data consumption rate of the consumer.

5. The computer-implemented method of claim 1 wherein the dynamically determined delivery rate is based on two flags related to events stored in the buffer.

6. The computer-implemented method of claim 5 wherein a different delivery rate may be associated with each of the two flags.

7. The computer-implemented method of claim 1, wherein the dynamically determined delivery rate further depends on a determination of whether the consumer desires at least one of: a critical notification scenario wherein the events are sent as soon as the events are received but no faster than the urgent flush rate; a notification type scenario wherein the events are sent in a delayed fashion as compared to critical notification scenarios; an analysis type scenario wherein the events are sent at up to the maximum flush size at a regular time interval; and a logging type scenario wherein the events are stored on a storage device.

8. The computer-implemented method of claim 7 wherein sending a single message comprising the set of events obtained from the buffer to the consumer at the dynamically determined delivery rate further comprises aggregating a plurality of events into the single message and sending the message to the consumer.

9. The computer-implemented method of claim 8 wherein aggregating the plurality of events comprises aggregating a number of events that is not greater than a maximum aggregation size.

10. The computer-implemented method of claim 7, wherein storing each of the events comprises selectively deleting one or more events from the buffer in response to the buffer storing a number of events equal to the event storage capacity of the buffer.

11. The computer-implemented method of claim 10 wherein the selectively deleting comprises deleting an event that is to be sent next to the consumer.

12. The computer-implemented method of claim 10 wherein the selectively deleting comprises deleting events such that no more than a predetermined number of consecutive events are deleted.

13. A buffering system to buffer events from a source of events and to send stored events to a consumer, the buffering system comprising:
    a processing unit;
    a buffer memory configurable to store events provided by the source of events, wherein the buffer memory includes data fields set for controlling operation of the buffer memory, the data fields comprising: a maximum buffer size, a regular flush rate; an urgent flush rate, an urgent flush threshold and a maximum flush size; and
    a buffer controller including a configuration data store, wherein the configuration data store includes one or more fields to each store a delivery rate of one or more delivery rates of events to a consumer, wherein the buffer controller performs actions, comprising:
        dynamically determining the delivery rate depending on: a maximum consumer rate defined by the consumer, a desired data consumption rate of the consumer and a first flag relating to a number of events currently stored in the buffer memory;
        obtaining a set of events from the buffer memory; and
        sending a single message comprising the set of events obtained from the buffer memory to a consumer at the dynamically determined delivery rate, wherein an amount of the events within the set of events to send within the single message is configurable.

14. The buffering system of claim 13 wherein the maximum consumer rate is defined as a frequency and size of data messages sent by the buffer controller.

15. The buffering system of claim 13 wherein the buffer controller directs the buffer memory to aggregate stored events and send the aggregated events as a message to the consumer.

16. The buffering system of claim 13 wherein, in response to the buffer memory storing a number of events equal to an event storage capacity of the buffer memory, the buffer controller selectively directs the buffer memory to delete one or more events from the buffer memory so the events sent to the consumer are more evenly distributed with respect to time.

17. A memory device having stored thereon instructions that when executed perform operations, comprising:
    receiving events from an instrumentation system in response to monitoring of a process, a portion of the events being generated by the instrumentation system at times during the monitoring of the process at a rate below a maximum data consumption rate of a consumer and another portion of the events being generated by the instrumentation system at a rate above the maximum data consumption rate of the consumer;
    storing each of the events in a configurable buffer, wherein the buffer includes data fields set for controlling operation of the buffer, the data fields comprising: a maximum buffer size, a regular flush rate; an urgent flush rate, an urgent flush threshold and a maximum flush size;
    determining a dynamic delivery rate using: a desired data consumption rate of the consumer, the maximum data consumption rate of the consumer and a first flag relating to a number of events currently stored in the buffer;
    obtaining a set of events from the buffer;
    sending a single message comprising the set of events obtained from the buffer to a consumer at the dynamically determined delivery rate, wherein an amount of the events within the set of events to send within the single message is configurable.

18. The memory device of claim 17, wherein the dynamically determined delivery rate further depends on a determination of whether the consumer desires at least one of: a critical notification scenario wherein the events are sent as soon as the events are received but no faster than the urgent flush rate; a notification type scenario wherein the events are sent in a delayed fashion as compared to critical notification scenarios; an analysis type scenario wherein the events are sent at up to the maximum flush size at a regular time interval; and a logging type scenario wherein the events are stored on a storage device.

19. The memory device of claim 18, wherein storing each of the events comprises selectively deleting one or more events from the buffer in response to the buffer storing a number of events equal to the event storage capacity of the buffer.

* * * * *